(12) United States Patent
White et al.

(10) Patent No.: US 8,973,059 B2
(45) Date of Patent: Mar. 3, 2015

(54) METHOD FOR PROTECTING SATELLITE RECEPTION FROM STRONG TERRESTRIAL SIGNALS

(75) Inventors: David White, Indianapolis, IN (US); Henri Girard, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 145 days.

(21) Appl. No.: 13/512,373

(22) PCT Filed: Dec. 9, 2009

(86) PCT No.: PCT/US2009/006455
§ 371 (c)(1),
(2), (4) Date: May 29, 2012

(87) PCT Pub. No.: WO2011/071468
PCT Pub. Date: Jun. 16, 2011

(65) Prior Publication Data
US 2012/0240168 A1 Sep. 20, 2012

(51) Int. Cl.
*H04N 7/20* (2006.01)
*H04H 40/90* (2008.01)

(52) U.S. Cl.
CPC *H04N 7/20* (2013.01); *H04H 40/90* (2013.01)
USPC .......................................... 725/68; 455/3.02

(58) Field of Classification Search
CPC ................................. H04N 7/20; H04H 40/90
USPC ...................... 725/68–70; 455/3.02
See application file for complete search history.

(56) References Cited

U.S. PATENT DOCUMENTS

| | | | |
|---|---|---|---|
| 3,571,715 A | 3/1971 | Beary et al. | |
| 3,911,366 A | 10/1975 | Baghdady | |
| 4,107,730 A | 8/1978 | Jones | |
| 4,263,619 A | 4/1981 | Theriault | |
| 4,361,909 A | 11/1982 | Theriault | |
| 4,399,559 A | 8/1983 | Theriault | |
| 4,499,602 A | 2/1985 | Hermeling, Jr. et al. | |
| 4,876,739 A | 10/1989 | Ma et al. | |
| 5,424,674 A | 6/1995 | Skudera, Jr. et al. | |
| 6,525,630 B1 * | 2/2003 | Zhu et al. | 333/205 |
| 6,653,912 B2 * | 11/2003 | Robinson et al. | 333/132 |
| 2002/0097112 A1 * | 7/2002 | Liang et al. | 333/134 |
| 2003/0027543 A1 | 2/2003 | Takaki | |
| 2004/0235445 A1 | 11/2004 | Gomez | |

FOREIGN PATENT DOCUMENTS

| | | |
|---|---|---|
| CA | 2108957 | 5/1994 |
| CN | 1489840 A | 4/2004 |

(Continued)

OTHER PUBLICATIONS

CN Search Report for Corresponding CN Application No. 2009801626274 dated Aug. 5, 2014.

*Primary Examiner* — Nathan Flynn
*Assistant Examiner* — Sumaiya A Chowdhury
(74) *Attorney, Agent, or Firm* — Robert D. Shedd; Kuniyuki Akiyama

(57) ABSTRACT

The present invention concerns an apparatus for protecting a satellite reception system from strong terrestrial signals. A high Q tunable trap is used to help reject strong ATSC signals or other signals that may be present on the input coaxial cable of a satellite receiver that operates in a single-wire multi-switch (SWM) environment.

4 Claims, 3 Drawing Sheets

(56) References Cited

FOREIGN PATENT DOCUMENTS

| | | |
|---|---|---|
| CN | 101010884 A | 8/2007 |
| EP | 0779707 | 6/1997 |
| EP | 1113604 | 7/2001 |
| JP | 55-141871 | 11/1980 |
| JP | 60-24736 | 2/1985 |
| JP | 62030479 | 2/1987 |
| JP | 31618 | 1/1991 |
| JP | 2004312646 | 11/2004 |
| JP | 2004349822 | 12/2004 |
| JP | 2004357039 | 12/2004 |
| JP | JP2005333528 | 12/2005 |
| WO | WO 91/11864 | 8/1991 |
| WO | WO02/51015 A2 | 9/2002 |
| WO | WO2006027733 A1 | 3/2006 |
| WO | WO 2009/075780 | 6/2009 |

* cited by examiner

METHOD FOR PROTECTING SATELLITE RECEPTION FROM STRONG TERRESTRIAL SIGNALS

This application is a National Stage Application and claims the benefit, under 35 U.S.C. §365 of International Application PCT/US2009/006455 filed Dec. 9, 2009 which was published in accordance with PCT Article 21(2) on Jun. 16, 2011 in English.

BACKGROUND OF THE INVENTION

The present invention generally relates to an apparatus for protecting a satellite reception system from strong terrestrial signals. A high Q tunable trap is used to help reject strong ATSC signals or other signals that may be present on the input coaxial cable of a satellite receiver that operates in a single-wire multi-switch (SWM) environment.

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Satellite television signals are generally received at a dish antenna, processed by a low-noise block down-converter (LNB), and delivered through the home on coaxial cable to a set-top box (STB) associated with a television display device. In more modern installations, signals from multiple satellite LNBs may be simultaneously transported to multiple STBs on the same coaxial cable by a single-wire multi-switch (SWM).

In some SWM environments, satellite L-band signals (950-2150 MHz) coexist on the same coaxial cable as terrestrial ATSC or other signals from 50-806 MHz. The ATSC signals can be strong enough to overload or damage the satellite front end and need to be attenuated to safe levels. The power from ATSC signals may also cause unwanted attenuation of the desired satellite signal by a wideband RF automatic gain control (AGC) scheme.

With the upper frequency limit of the ATSC spectrum so close to the lower frequency limit of the satellite spectrum, it is difficult to design a satellite high-pass filter of reasonable complexity that can attenuate the ATSC signals without also impacting the lowest satellite frequencies. In many installations, an external diplexer is used to prevent ATSC signals from entering the satellite input connection. However, it would be advantageous if the satellite receiver could continue to operate even if the external diplexer was omitted from the installation. The invention described herein addresses this and/or other problems.

SUMMARY OF THE INVENTION

In order to solve the problems described above, the present invention concerns an apparatus for protecting a satellite reception system from strong terrestrial signals. A high Q tunable trap is used to help reject strong ATSC signals or other signals that may be present on the input coaxial cable of a satellite receiver that operates in a single-wire multi-switch (SWM) environment. This and other aspects of the invention will be described in detail with reference to the accompanying Drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

As described herein, the present invention provides an apparatus for protecting a satellite reception system from strong terrestrial signals. A high Q tunable trap is used to help reject strong ATSC signals or other signals that may be present on the input coaxial cable of a satellite receiver that operates in a single-wire multi-switch (SWM) environment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The present invention may be implemented in the signal tuning electronics of a satellite television set-top box or other device capable of tuning television signals. The disclosed apparatus and technique may also be used in other signal reception applications.

Figure 1:
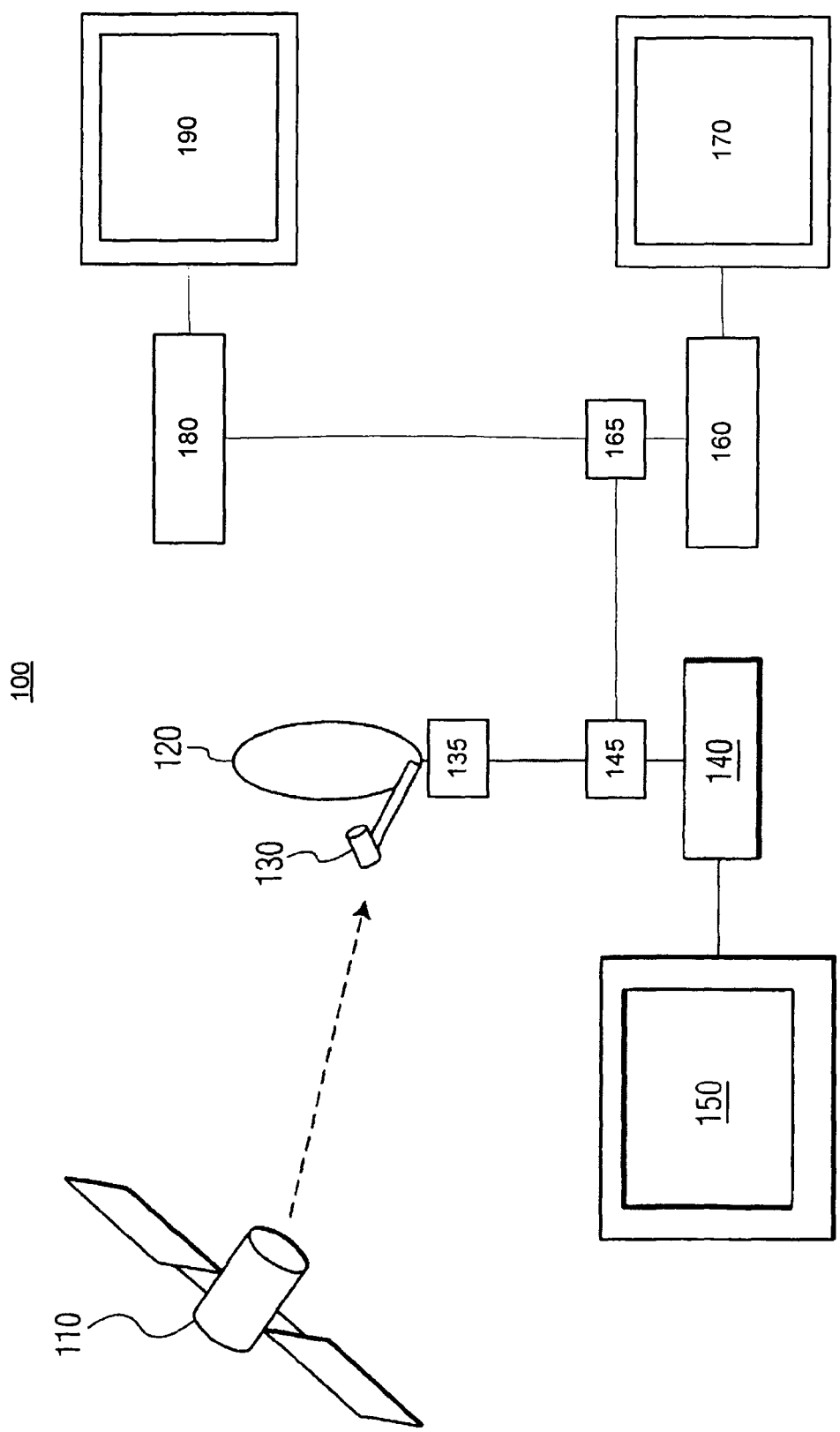
FIG. 1 is a diagram of an exemplary embodiment of a satellite television system.

FIG. 1 is a diagram of an exemplary embodiment of a satellite television system. The satellite television system operates to broadcast microwave signals to a wide broadcast area by transmitting the signals from a geosynchronous satellite 110. A geosynchronous satellite 110 orbits the earth once each day at approximately 35,786 kilometers above the surface of the Earth. Such broadcast satellites 110 generally orbit around the equator and remain in the same position with respect to positions on the ground, allowing a satellite receiving antenna 120 to maintain a fixed look angle.

Satellite 110 receives signals from uplink transmitters and then rebroadcasts the signals back to earth using a set of transponders utilizing a variety of transmission frequencies. The altitude of the transmitting satellite 110 allows subscribers in a wide geographical area to receive the signal.

The distance from the earth and the severe power conservation requirements of the satellite result in a relatively weak signal being received at the antenna 120. It is therefore critical that the signal be amplified as soon as possible after it is received by the antenna. This requirement is achieved through the placement of a low noise block downconverter (LNB) 130 at the feed horn of the parabolic dish antenna 120. In a simple single set-top box configuration, the selected signal from the LNB 130 may travel along a coaxial cable to a digital satellite set-top box 140, which tunes a desired channel for presentation on television display device 150. In some installations, a single-wire multi-switch (SWM) 135 may be used to multiplex signals from multiple LNBs and their multiple polarities onto a single coaxial cable for delivery into the home.

Splitters 145 and 165 may be used to split the signals to cables running to other set top boxes 160 and 180, connected to television display devices 170 and 190, respectively. A similar configuration may exist in a cable-based installation. A single feed from the local cable distribution system may enter the house and be split to coaxial cables running to multiple cable set-top boxes.

The cabling and splitters used to carry received satellite signals from SWM 135 to set-top boxes 140, 160, and 180, and carry control information back to the SWM 135, may also be used for communication between set-top boxes. For instance, a set-top box 140 containing a DVR may provide access to recorded content to other set-top boxes 160 and 180 in the home. The Multimedia over Coax Alliance (MoCA™) standard describes one method of providing such functionality. In the case of a satellite television system, these digital home networking (DHN) communications between boxes occur at frequencies below those for LNB-to-STB or SWM-to-STB communications.

Figure 2:
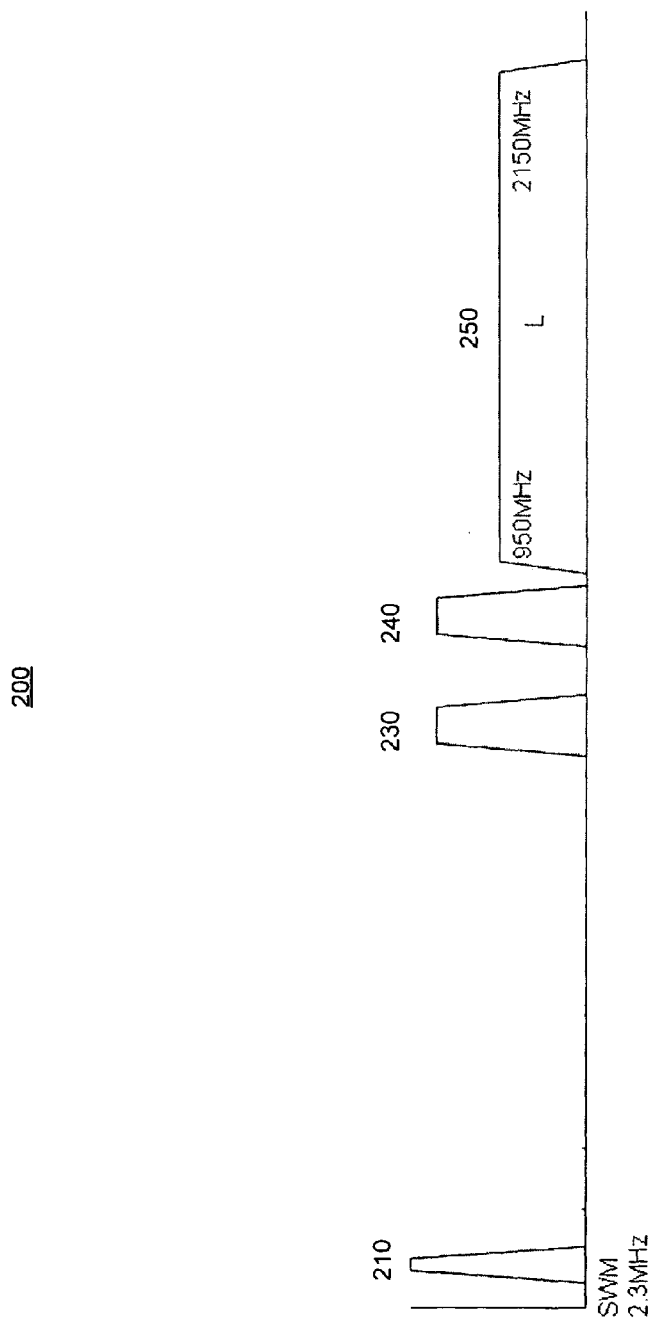
FIG. 2 is a diagram of an example of a power spectrum on a coaxial cable in an SWM environment.

In some installations, satellite L-band signals (950-2150 MHz) may coexist on the same coaxial cable as terrestrial ATSC or other signals from 50-806 MHz. FIG. 2 shows an example of such a signal spectrum that may be encountered by a satellite set top box. Communications between the STBs and the SWM 210 reside at 2.3 MHz. Satellite television signals 250 from the LNBs occupy the band from 950 MHz to 2150 MHz. In this example, two ATSC signals 230 and 240 are present just below 950 MHz.

The ATSC signals may be strong enough to overload or damage the satellite front end, or may cause a wideband RF AGC detection scheme to reduce input gain, causing unwanted attenuation of the desired satellite signal. With the upper frequency limit of the ATSC spectrum so close to the lower frequency limit of the satellite spectrum, it is difficult to design a high-pass filter of reasonable complexity that can attenuate the ATSC signals without also impacting the lowest satellite frequencies. Thus, in many installations, an external diplexer is used to prevent ATSC signals from entering the satellite input connection. However, it would be advantageous if the satellite receiver could continue to operate even if the external diplexer was omitted from the installation.

A potential solution would be to use a standard high-pass filter that would either be switched into use when the STB is in SWM mode or would be part of a diplexer structure. With the use of a standard filter, however, the order and topology required for such a filter to meet all of the specifications becomes impractical for mass production devices. Standard filters may also produce a level of insertion loss that reduces the input sensitivity of the front end.

To address this problem, a high Q notch filter, or "trap," may be added to the receiving system and tuned as needed in response to interfering signals in the ATSC frequency range. The "Q" or "quality" factor of a filter refers to the sharpness of the filter or its ability to select the desired band and reject unwanted signals near the desired band. The resonant frequency of the trap can be adjusted until the interfering signal is reduced to safe levels or the effect on gain control of the desired signal is minimized.

Figure 3:
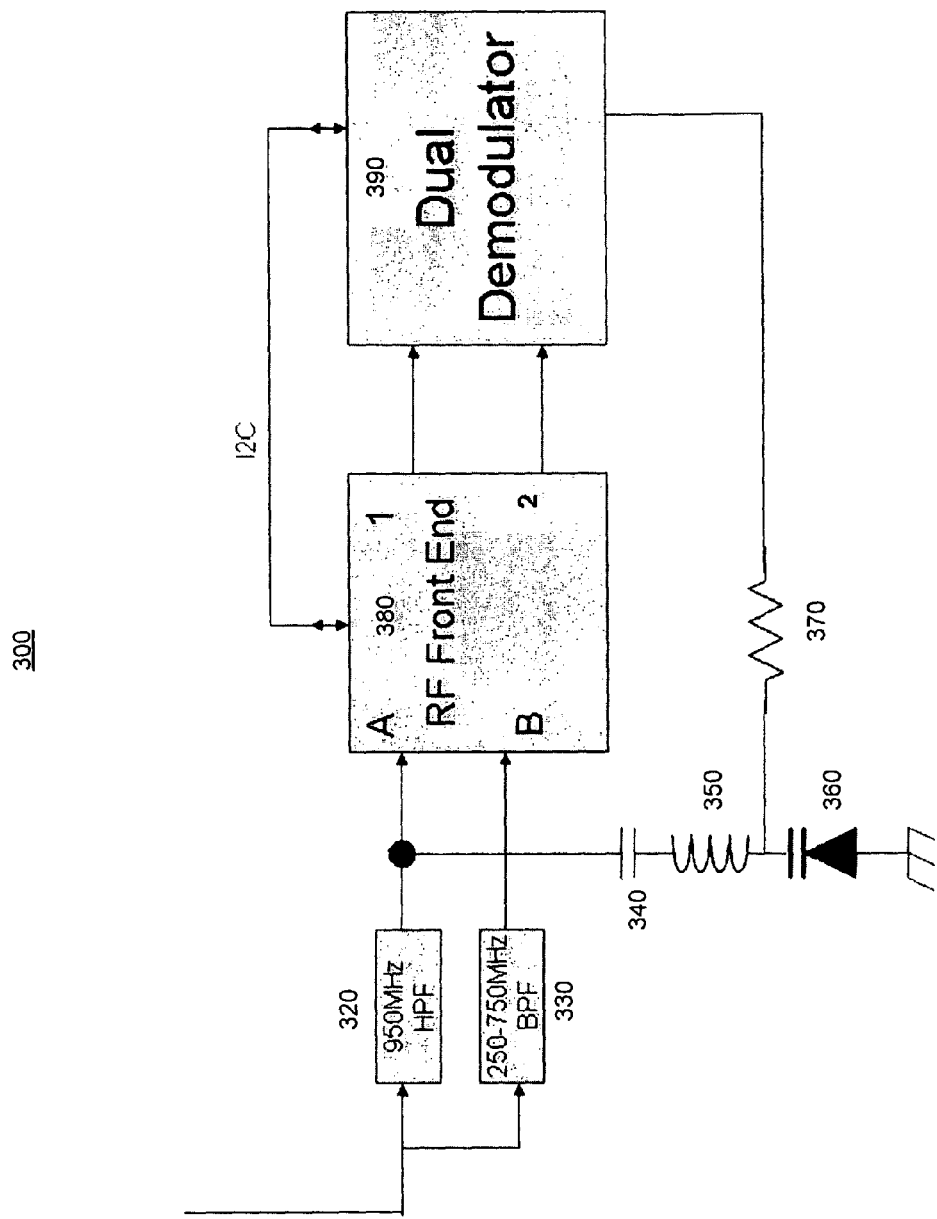
FIG. 3 is a block diagram of a portion of a satellite signal receiving system with a tunable trap circuit.

FIG. 3 is a diagram of a portion of a satellite signal reception system 300 that includes such a tunable trap. In this example, signals from the SWM are received and split to a high-pass filter 320 which passes the satellite band above 950 MHz and a band-pass filter 330 which passes B-band (250-750 MHz) to the inputs of the RF front end 380. The functions of the RF front end may vary, but will generally comprise a matching circuit, band-pass filter, low-noise amplifier, and mixing. The RF front end 380 in this example acts as a 2×2 switch for routing signals to outputs connected to dual demodulator 390. In some implementations, an RF front end with a single SWM-capable input may be used. The RF front end 380 also provides a wideband AGC function for adjusting the levels of the received signals.

The tunable trap circuit comprises capacitor 340 in series with inductor 350 and varactor diode 360, which is coupled to ground. Demodulator 390 performs narrowband AGC for the channels of interest and provides a bias voltage to the tunable trap via resistor 370, which is connected between varactor diode 360 and inductor 350. The voltage applied by demodulator 390 sets the resonant frequency of the trap, and thus the range of frequencies that are attenuated.

Various control algorithms may be employed to tune the trap for rejection of the unwanted signals, but the method will generally comprise receiving a signal; filtering the received signal with a high-pass filter, measuring a signal parameter, adjusting a tunable trap responsive to the resulting measurement. One possible method comprises reducing the level of the interfering signal through tuning of the trap until the total power seen by the wideband detection of the RF front end is no longer impacted appreciably. Another potential method would involve using the B-band input and measuring the narrowband AGC value of the interfering signal. The tunable trap would then be tuned so as to minimize this value. Another potential control parameter would be the input signal-to-noise ratio (SNR) of the desired signal at the demodulator. In each case, assessment of the measured parameter could be used as a method of assessing the effect on ATSC signal rejection of various bias voltages and their corresponding trap center frequencies. An iterative control algorithm may be used to seek an optimal value of the chosen parameter.

An additional consideration exists in non-SWM environments using more traditional DiseqC LNBs. When operating with a DiseqC LNB, the receiver must tune satellite signals in the B-band. This may not be an issue with a diplexer topology, but in front ends where a single input is used, the tuned notch can cause unwanted losses within B-band. Care must be taken that either the varactor has sufficient tuning range to move its notch above 2150 MHz or below 250 MHz, or that an additional switch diode is available to disconnect the circuit from the RF path when it is not required.

While the present invention has been described in terms of a specific embodiment, it will be appreciated that modifications may be made which will fall within the scope of the invention. For instance, the functions of the RF front end and demodulator blocks may be combined or otherwise segmented. Certain functions, like those associated with AGC loops, may be implemented in software or firmware. Various functions may be performed using generalized signal processing or computing hardware. Furthermore, the same principles may be applied to the rejection of frequency bands of other types of interfering signals and in other reception environments.

The invention claimed is:

1. An apparatus comprising:
a filter coupled to a source of a first signal and a second signal, said filter including a high-pass filter;
a tunable trap filter coupled to said filter for filtering said second signal within a passband of said filter; and
a demodulator for demodulating said first signal and determining a signal parameter of at least one of said first signal and said second signal and generating a control signal for controlling said tunable trap filter in response to said signal parameter, wherein said tunable trap filter includes a capacitor coupled to an output of said high-pass filter, an inductor coupled to said capacitor, a resistor coupled to said inductor and to said demodulator, a varactor diode coupled to said inductor, to said resistor, and to a ground potential;

said control signal adjusts a bias voltage applied to said tunable trap filter responsive to said signal parameter, said bias voltage is used to adjust the resonant frequency of said tunable trap filter, and said tunable trap exhibiting a high Q characteristic rejects said second signal, said second signal including ATSC or other unwanted terrestrial signals that may be present on said filter under a single-wire multi-switch (SWM) environment.

2. The apparatus of claim 1 wherein said high-pass filter substantially passes signals with frequencies of 950 MHz and above.

3. A method comprising the steps of:
filtering a first signal and a second signal with a filter, said filter including a high-pass filter;
filtering said second signal within a passband of said filter with a tunable trap filter; and
demodulating said first signal and determining a signal parameter of at least one of said first signal and said second signal and generating a control signal for controlling said tunable trap filter in response to said signal parameter, wherein said tunable trap filter includes a capacitor coupled to an output of said high-pass filter, an inductor coupled to said capacitor, a resistor coupled to said inductor and to said demodulator, a varactor diode coupled to said inductor, to said resistor, and to a ground potential;

said control signal adjusts a bias voltage applied to said tunable trap filter responsive to said signal parameter, said bias voltage is used to adjust the resonant frequency of said tunable trap filter, and said tunable trap exhibiting a high Q characteristic rejects said second signal, said second signal including ATSC or other unwanted terrestrial signals that may be present on said filter under a single-wire multi-switch (SWM) environment.

4. The apparatus of claim 3 wherein said high-pass filter substantially passes signals with frequencies of 950 MHz and above.

\* \* \* \* \*